US007483834B2

(12) United States Patent
Naimpally et al.

(10) Patent No.: US 7,483,834 B2
(45) Date of Patent: Jan. 27, 2009

(54) METHOD AND APPARATUS FOR AUDIO NAVIGATION OF AN INFORMATION APPLIANCE

(75) Inventors: Saiprasad V. Naimpally, Langhorne, PA (US); Vasanth Shreesha, Maple Shade, NJ (US)

(73) Assignee: Panasonic Corporation, Osaka (JP)

( * ) Notice: Subject to any disclaimer, the term of this patent is extended or adjusted under 35 U.S.C. 154(b) by 621 days.

(21) Appl. No.: 09/997,391

(22) Filed: Nov. 30, 2001

(65) Prior Publication Data

US 2003/0105639 A1 Jun. 5, 2003

Related U.S. Application Data

(60) Provisional application No. 60/306,214, filed on Jul. 18, 2001.

(51) Int. Cl.
*G10L 13/00* (2006.01)
*G10L 13/02* (2006.01)
*H04N 7/025* (2006.01)

(52) U.S. Cl. .................... 704/270.1; 704/258; 704/260; 704/270; 704/271; 725/39

(58) Field of Classification Search ................. 704/258, 704/260, 271, 275, 270, 270.1; 348/563; 748/563; 725/39–40

See application file for complete search history.

(56) References Cited

U.S. PATENT DOCUMENTS 5,353,121 A 10/1994 Young et al.
5,475,835 A * 12/1995 Hickey .................... 707/104.1
5,677,739 A 10/1997 Kirkland
5,734,786 A 3/1998 Mankovitz
5,737,030 A * 4/1998 Hong et al. .................... 725/41
5,774,859 A * 6/1998 Houser et al. ............... 704/275
5,815,145 A * 9/1998 Matthews, III ............... 725/41
5,822,123 A * 10/1998 Davis et al. .................... 725/43

(Continued)

FOREIGN PATENT DOCUMENTS

EP 1033701 A2 * 9/2000
JP 2000253326 A * 9/2000

OTHER PUBLICATIONS

Krahmer. "The Science and Art of Voice Interfaces." Research report, Philips Research, Eindhoven, Netherlands, 2001.*

(Continued)

*Primary Examiner*—James S Wozniak
(74) *Attorney, Agent, or Firm*—RatnerPrestia

(57) ABSTRACT

The invention includes an apparatus and method of providing information using an information appliance coupled to a network. The method includes storing text files in a database at a remote location and converting, at the remote location, the text files into speech files. A portion of the speech files requested are downloaded to the information appliance and presented through an audio speaker. The speech files may include audio of electronic program guide (EPG) information, weather information, news information or other information. The method also includes converting the text files into speech files at the remote location using an English text-to-speech (TTS) synthesizer, a Spanish TTS synthesizer, or another language synthesizer. A voice personality may be selected to announce the speech files.

23 Claims, 5 Drawing Sheets

U.S. PATENT DOCUMENTS 5,924,068 A 7/1999 Richard et al.
5,953,392 A * 9/1999 Rhie et al. .................. 704/271
6,020,880 A * 2/2000 Naimpally ................... 725/48
6,025,837 A * 2/2000 Matthews et al. ........... 715/721
6,075,575 A 6/2000 Schein et al.
6,081,780 A * 6/2000 Lumelsky ................... 704/260
6,141,642 A * 10/2000 Oh ............................. 704/260
6,289,085 B1 * 9/2001 Miyashita et al. ........ 379/88.02
6,289,312 B1 * 9/2001 Raman ....................... 704/270
6,304,523 B1 10/2001 Jones et al.
6,330,537 B1 * 12/2001 Davis et al. ................ 704/260
6,341,195 B1 1/2002 Mankovitz et al.
6,381,465 B1 * 4/2002 Chern et al. ................ 455/466
6,417,888 B1 7/2002 Dunn et al.
6,456,978 B1 * 9/2002 Wymore et al. ............. 704/275
6,510,209 B1 * 1/2003 Cannon et al. ........... 379/88.13
6,526,382 B1 * 2/2003 Yuschik ...................... 704/275
6,557,026 B1 * 4/2003 Stephens, Jr. ............... 704/260
6,603,838 B1 * 8/2003 Brown et al. ............. 379/88.22
6,625,576 B2 * 9/2003 Kochanski et al. .......... 704/260
6,654,721 B2 * 11/2003 Handelman ................. 704/270
6,678,659 B1 * 1/2004 Van Kommer ............. 704/260
6,707,891 B1 * 3/2004 Guedalia ................. 379/88.17
6,856,990 B2 * 2/2005 Barile et al. .................. 707/10
6,943,845 B2 9/2005 Mizutome et al.
2001/0048736 A1 * 12/2001 Walker et al. ............ 379/88.23
2002/0040476 A1 * 4/2002 Whitehead ................... 725/39
2003/0066075 A1 * 4/2003 Bahn et al. .................... 725/25
2003/0078989 A1 * 4/2003 Ladd .......................... 709/218
2004/0168187 A1 * 8/2004 Chang ......................... 725/40

OTHER PUBLICATIONS

Tanaka et al. "Back to the TV: Information Visualization Interfaces Basedon TV-Program Metaphors," Proceedings of IEEE International Conference on Multimedia & Expo (ICME2000), pp. 1229-1232, 2000.*

Asakawa et al. "User Interface of a Home Page Reader". In Third Annual ACM Conference on Assistive Technologies, 1998, pp. 149-156.*

Adams et al, "IBM products for persons with disabilities," Global Telecommunications Conference, 1989, and Exhibition. 'Communications Technology for the 1990s and Beyond'. Globecom '89., IEEE , Nov. 1989, pp. 980-984.*

* cited by examiner

METHOD AND APPARATUS FOR AUDIO NAVIGATION OF AN INFORMATION APPLIANCE

CROSS-REFERENCE TO RELATED APPLICATIONS

This application claims the benefit of U.S. Provisional Application No. 60/306,214, filed Jul. 18, 2001, the contents of which are incorporated herein by reference.

FIELD OF THE INVENTION

The present invention relates, generally, to Internet-capable appliances and, more specifically, to methods and apparatus for configurating such appliances for audio navigation.

BACKGROUND OF THE INVENTION

Electronic Program Guide (EPG) is a favorite channel on television because it helps navigate the user through a myriad of program choices. EPG, however, cannot be used by visually impaired persons because of the graphics-rich user interface. The many subliminal visual cues available to sighted users are absent for blind/visually impaired users. Visual information is not presented in an understandable format to the visually impaired, nor is data rearranged to suit an accessibility mode for the visually impaired.

Embedded text to speech (TTS) algorithms have been demonstrated in appliances to convert text-based EPG to audio-enabled EPG. These appliances are expensive, however, since a good quality TTS synthesizer is required in each appliance. Large storage capacity is also required to accommodate a TTS synthesizer.

A need exists, therefore, to provide an audio enabled system using an information appliance that is compatible with a visually impaired user, and does not require an expensive internal TTS synthesizer.

SUMMARY OF THE INVENTION

To meet this and other needs, and in view of its purposes, the present invention includes a method of providing information using an information appliance coupled to a network. The method includes storing text files in a database at a remote location and converting, at the remote location, the text files into speech files. The method also includes requesting a portion of the speech files. The portion of the speech files requested are downloaded to the information appliance and presented through an audio speaker. The speech files may include audio of electronic program guide (EPG) information, weather information, news information or other information.

The method may include downloading the speech files in response to a specific request, or downloading the speech files at periodic time intervals. The speech files may be stored or buffered in a memory device of the information appliance and later presented, through the audio speaker, in response to a request.

In another embodiment, the method includes converting the text files into speech files at the remote location using an English text-to-speech (TTS) synthesizer, a Spanish TTS synthesizer, or another language synthesizer. A voice personality from a list of multiple voice personalities may also be selected. In response to the selection, the method converts the text files into speech files using the selected voice personality.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawings. Included in the drawings are the following figures.

DETAILED DESCRIPTION OF THE INVENTION

Figure 1:
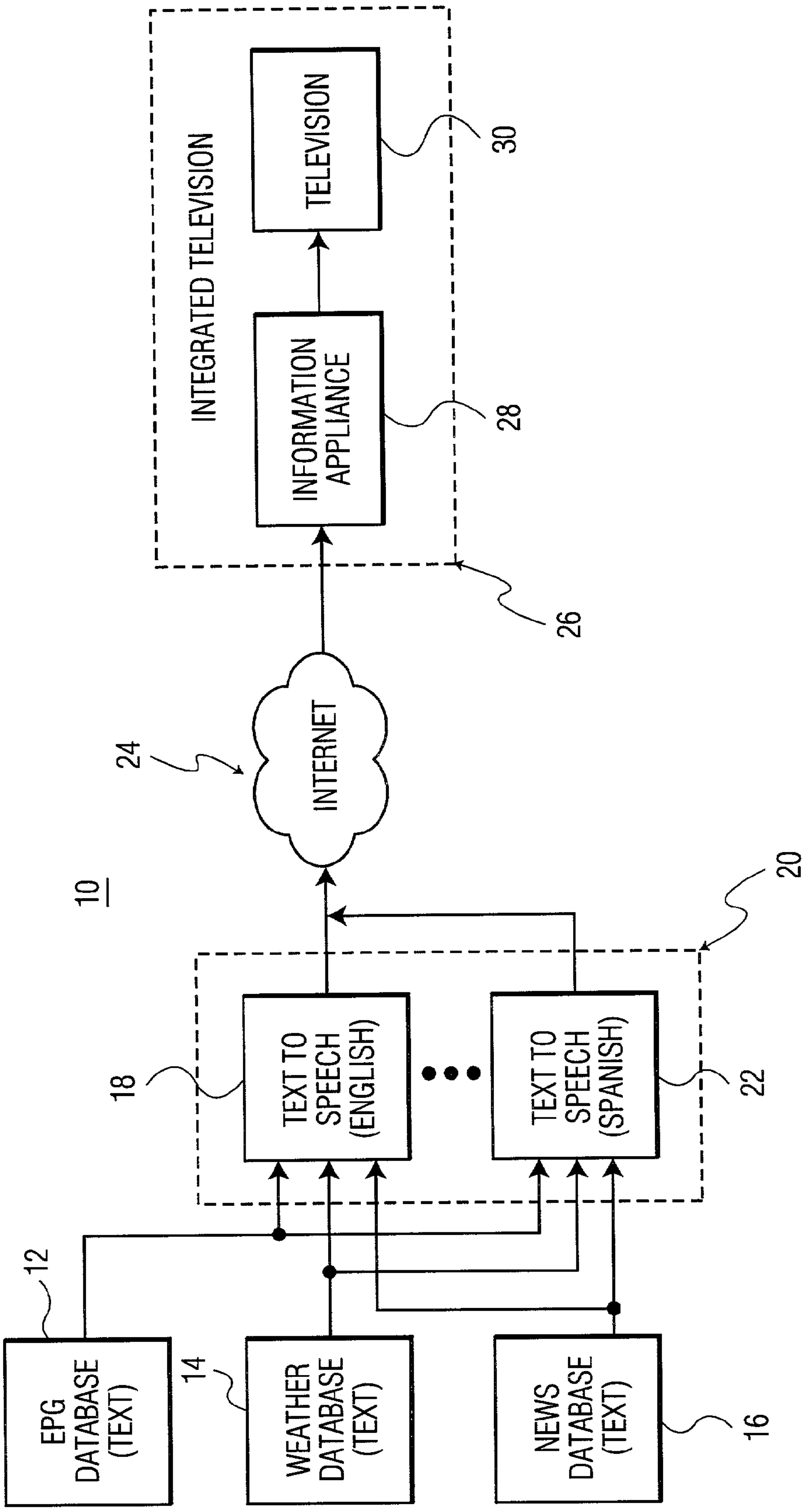
FIG. 1 is an overview of an audio-enabled data service system according to an embodiment of the present invention.

FIG. 1 is an overview of an audio-enabled data service system, generally designated by numeral 10. In the embodiment shown, audio-enabled data service system 10 includes text-to-speech (TTS) application server 20 communicatively coupled to integrated television 26 by way of Internet 24. Integrated television 26 includes information appliance 28 and television 30.

As will be explained, a user wishing to access TTS application server 20 may activate a setup procedure in information appliance 28 which then dials server 20. The user may call, or the appliance may automatically dial after obtaining permission from the user, a specific dial-up number provided to the user. The server may be accessed via a telephone connection established by a Service Control Point (SCP) located in a telephone network, such as Publicly-Switched Telephone Network (PSTN), wireless network or cableless network (not shown). In many cases, the user of information appliance 28 needs an Internet Service Provider (ISP) (not shown) to complete the connection, via the Internet, between information appliance 28 and server 20.

It is apparent to one skilled in the art that Internet 24 may be of another type of data network, such as an Intranet, private Local Area Network (LAN), Wide Area Network (WAN), and so on.

Having connected to TTS application server 20, interfacing software (not shown) in the server may recognize information appliance 28 by telephone number recognition via destination number identification service (DNIS) and automatic number identification (ANI). By recognizing information appliance 28, the server may select appropriate set-up routines to deal with the specific information appliance.

TTS application server 20 may include a large repository, which may be internal or separate from the server. Shown separate from server 20 in FIG. 1, the repository may include electronic program guide (EPG) database 12, weather database 14 and news database 16. As will be appreciated, additional databases containing other types of information may also be included, for example, a sports database.

In the embodiment shown, EPG information, weather information, and news information are stored as text. A text-to-speech (TTS) synthesizer is used to convert the text to speech (audio). A high quality text-to-speech software program may be resident in server 20, with versions to support multiple languages. As shown in FIG. 1, server 20 includes English TTS program 18 and Spanish TTS program 22.

When the user powers up the appliance for the first time, set-up information including software and protocol drivers may be delivered to information appliance 28 via the dial-up connection. In some cases, server 20 may communicate directly to a counterpart at the ISP and open an account for the appliance.

A resident audio program may prompt the user to select between text navigation or speech navigation. A normally sighted user may select text-navigation; a visually impaired user, on the other hand, may select audio-navigation. If the user selects audio-navigation, the resident program may provide a choice of different voices, including celebrity voices in various languages. A speech file may be downloaded from the server to the appliance, and stored or buffered in the appliance for later, or immediate presentation to the user.

If the user selects text-navigation, text data may be downloaded from the server to the appliance. The text data may be stored in the appliance and later, or immediately displayed on television 30. Alternatively, a combination of text-navigation and audio-navigation may be selected by the user, in which case text data may be displayed on the television screen and audio data may be heard through audio speakers.

The files (speech, text or both) may be presented to the user as choices for easy navigation. When the user selects a choice, details of the choice may be presented. The user may also select, interrupt, or skip data by using a remote control. Navigation may be enriched by adding graphics to the audio and text data.

Figure 2:
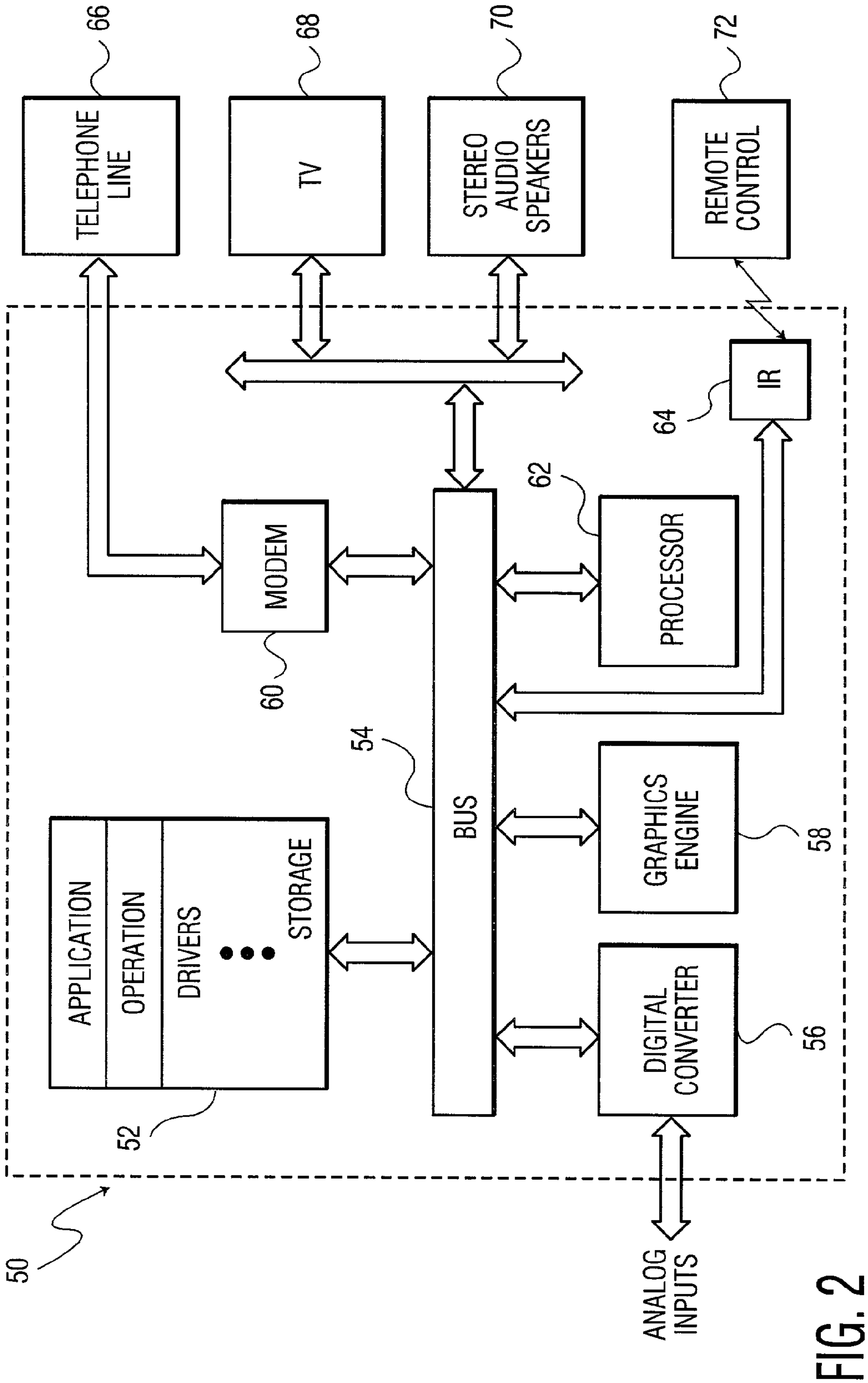
FIG. 2 is an exemplary embodiment of an information appliance.

An exemplary embodiment of an information appliance is shown in FIG. 2 and is generally designated by the numeral 50. It will be understood that an information appliance may be a laptop, a desktop computer, a set-top box (STB), and the like, all of which are Internet-capable and are, therefore, Internet appliances. Exemplary information appliance 50 includes modem 60 connected or attached to telephone lines 66 for accessing the Internet via an ISP. Different types of data, including audio and text data, may be exchanged between information appliance 50 and TTS application server 20. The data exchanged may also include user identification, and preferences for downloading data from the server. The data may be formatted according to an application layer protocol having frame formats for telephone functions. These may include communications protocol hierarchy with Application Program Interface (API), Point-to-Point Protocol (PPP), and High-level Data Link Control (HDLC) layers for telephony applications.

It will be appreciated that although information appliance 50 is shown connected to telephone lines 66, it may be connected to a digital subscriber line (DSL), a twisted-pair cable, an integrated service digital network (ISDN) link, or any other link, wired or wireless, that supports packet switched communications, including Internet Protocol (IP)/Transmission Control Protocol (TCP) communications using an Ethernet.

Information appliance 50 includes output devices, such as television 68 for displaying standard definition video and listening of audio through internal speakers. Stereo audio speakers 70, which are separate from television 68 may also be included. An input device, such as IR receiver 64, may be included for receiving control commands from user remote control 72.

Information appliance 50 includes processor 62 coupled by way of bus 54 to storage 52, digital converters 56 and graphics engine 58. Bus 54 collectively represents all of the communication lines that connect the numerous internal modules of the information appliance. Although not shown, a variety of bus controllers may be used to control the operation of the bus.

One embodiment of storage 52 stores application programs for performing various tasks, such as manipulating text, numbers and/or graphics, and manipulating audio (speech) received from telephone lines 66. Storage 52 also stores an operating system (OS) which serves as the foundation on which application programs operate and control the allocation of hardware and software resources (such as memory, processor, storage space, peripheral devices, drivers, etc.). Storage 52 also stores driver programs which provide instruction sets necessary for operating or controlling particular devices, such as digital converter 56, graphics engine 58 and modem 60.

An embodiment of storage 52 includes a read and write memory (e.g., RAM). This memory stores data and program instructions for execution by processor 62. Also included is a read-only memory (ROM) for storing static information and instructions for the processor. Another embodiment of storage 52 includes a mass data storage device, such as a magnetic or optical disk and its corresponding disk drive.

It will be appreciated that processor 62 may be several dedicated processors or one general purpose processor providing I/O engines for all the I/O functions (such as communication control, signal formatting, audio and graphics processing, compression or decompression, filtering, audio-visual frame synchronization, etc.). Processor 62 may also include an application specific integrated circuit (ASIC) I/O engine for some of the I/O functions.

Digital converters 56, shown in FIG. 2, receive baseband video and audio signals (tuner not shown) from a broadcasting television station, and provide digital audio and digital video to processor 62 for formatting and synchronization. Prior to sending data to television 68 and speakers 70, processor 62 may encode audio-visual data in a unique format for presentation and listening (e.g., an NTSC, SDTV, or HDTV format for television).

Files stored as text and speech at server 20 (FIG. 1) may be received at information appliance 50. Speech (audio) may be received in various formats, such as AAC, MP3, WAV, etc, and may be compressed to save bandwidth. Resources for processing the data (text and speech) may be provided by processor 62, and may include resources for Internet access (Internet application programs), resources for producing a compatible display of text and graphics on television monitor 68, resources for implementing synchronized audio, and resources for control of information through a remote keypad control, such as infrared remote control 72.

Figure 3:
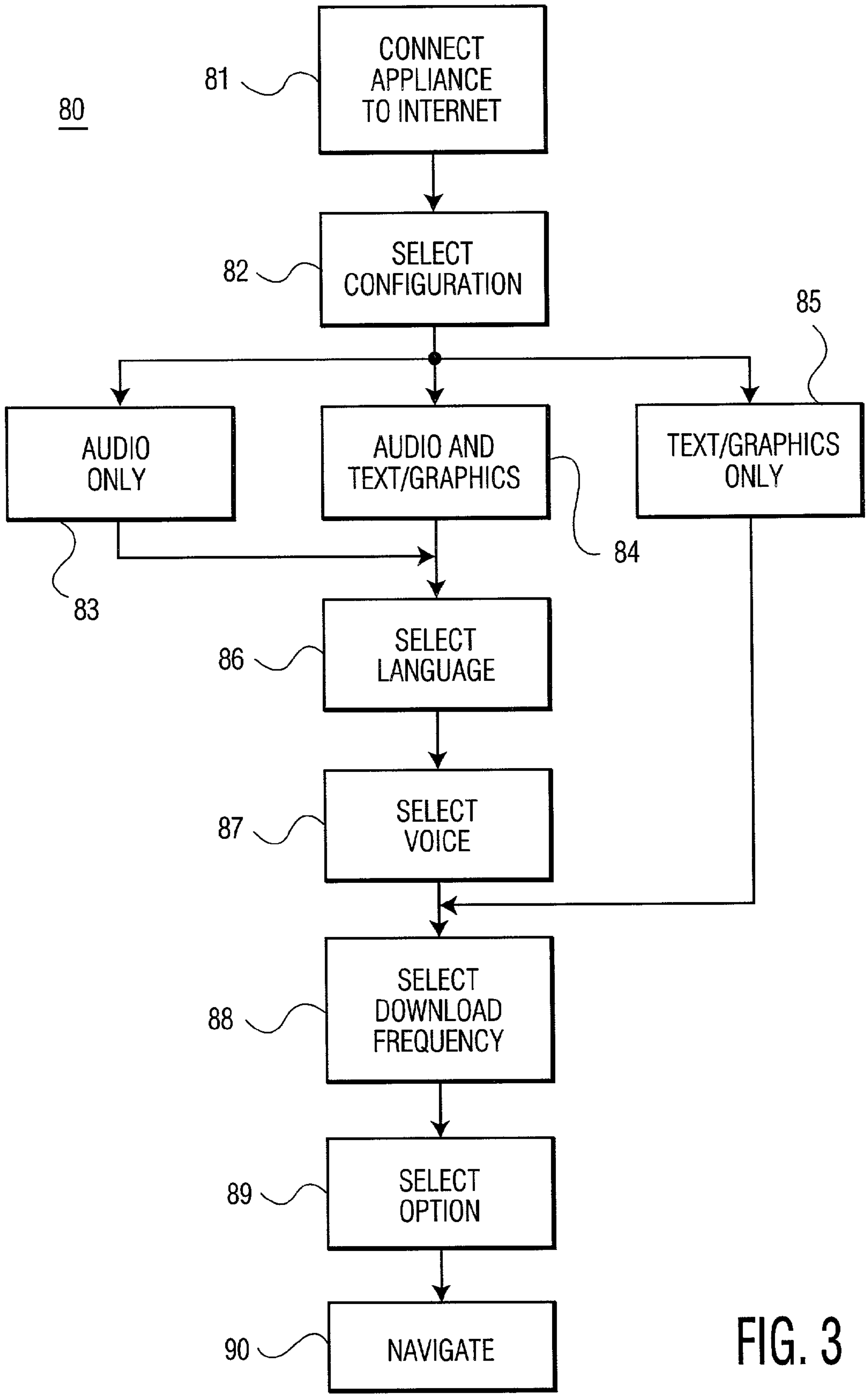
FIG. 3 is a basic workflow diagram illustrating steps involved in a typical operation executed via interfacing software according to an embodiment of the present invention.

FIG. 3 is a basic workflow diagram illustrating steps involved in a typical operation executed via interfacing software according to an embodiment of the present invention. The method shown in FIG. 3, generally designated by reference numeral 80, is described below.

A user plugs in a specific appliance, such as information appliance 50 of FIG. 2, and insures that all hardware connections are correct (step 81). The user calls or the appliance dials, after obtaining user permission, a specific dial-up number. The appliance is then connected to TTS application server 20. After confirming identity, a set-up application is launched to access protocol information and network drivers.

After the appliance is successfully set-up, a clear-for-operation signal may be issued for the user to begin using the appliance. In step 82, a voice may prompt the user to "select configuration". The user may, for example, first hear "visual mode?". Secondly, the user may hear "audio mode?". Thirdly, the user may hear “both, visual and audio modes?”. The user may select audio (step 83), corresponding to “audio mode?”; text/graphics only (step 85), corresponding to “visual mode?”; or audio and text/graphics (step 84), corresponding to “both, visual and audio modes?”.

Using remote control 72 (FIG. 2) the first, second, or third configuration may be selected by pressing any key immediately after hearing the specific configuration announced. The selected configuration may be announced again, thereby confirming user selection.

A voice may prompt the user to select from a list of different languages (step 86). For example, the user may first hear “English?”. Secondly, the user may hear “Spanish”? and so on. Again, using the remote control, the user may select the first (English), second (Spanish), or another language by pressing any key immediately after hearing the specific language announced. The selected language may be announced again, thereby confirming user selection.

A voice may prompt the user to select from a list of different voices (step 87). For example, the user may first hear a male voice saying “Mel Gibson?”. Secondly, the user may hear a female voice saying “Marilyn Monroe?”. Thirdly, the user may hear a cartoon voice saying “Donald Duck?38 . Again, using the remote control, the user may select a voice by pressing any key immediately after hearing the specific voice announced. The selected voice may be announced again, thereby confirming user selection.

It will be appreciated that the steps described above may vary widely according to desired implementation. For example, if the user selects the text/graphics only configuration in step 85, language selection (step 86) and voice selection (step 87) may be skipped.

Having selected configuration, language and voice, the method enters step 88 to select download frequency. Files from the server may be periodically downloaded every night at a preset time, or upon a specific request by the user. For example, if the appliance is a set-top box (STB) and is Internet-ready, the STB may periodically download audio and text files every night at midnight containing electronic program guide (EPG) information of scheduled television programs for the next day. Alternatively, the STB may download audio-enabled EPG files upon a specific request from the user. The downloaded files may be stored or temporarily buffered in the appliance. In this manner, a visually impaired user may enjoy audio-enabled EPG.

Figure 4:
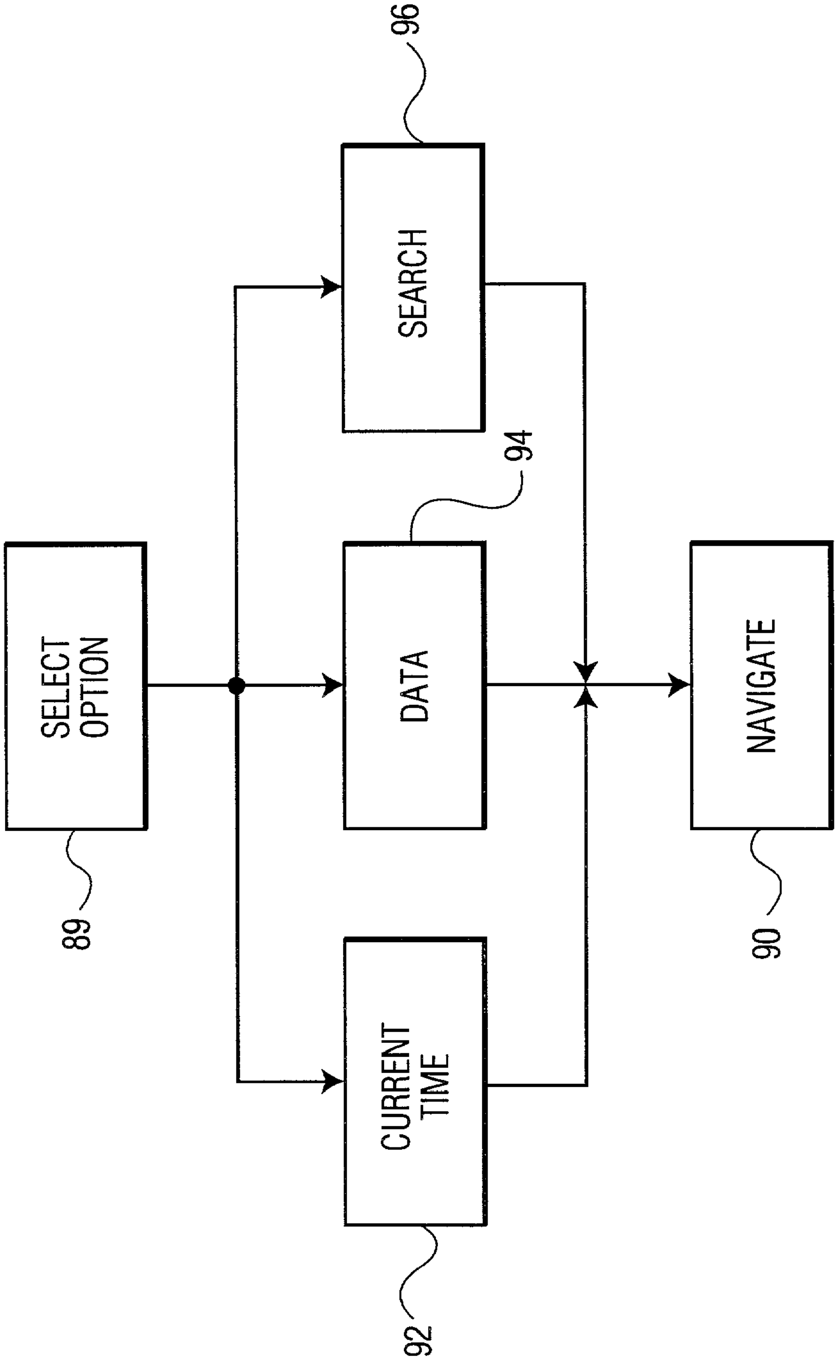
FIG. 4 illustrates various options that may be selected by a user during the operation diagrammed in FIG. 3.

When the EPG or Guide button (for example) is selected on the remote control (step 89), the method enters step 90 allowing the user to navigate through the downloaded files using the remote control. As shown in FIG. 4, once inside the EPG, one of several options for navigating through EPG content may be selected. The options may include current time (step 92), date (step 94) and search (step 96). The options may be presented to the user in sequence, with pauses between sequences. For example, the use may first hear “current time?”. The user may select the current time option by pressing any key on the remote control. The audio may then announce the following: 10:00 p.m. (brief pause), Channel 2—CNN Larry King Live (brief pause), Channel 3—Fox Baseball, Red Sox vs. Yankees (brief pause), Channel 4—(and so on). Accordingly, the audio may sequence through every program offered at 10:00 p.m. Next, the audio may sequence through every program offered at 10:30 p.m. (and so on).

The user may interrupt the sequence at any time by simply pressing an arrow key (for example) on the remote control. With no interruption from the user, the STB may continue announcing in sequence all the viewing possibilities until the list of offering is complete, wrapping from 10:00 p.m. to 10:30 p.m., then to 11:00 p.m., etc. Upon pressing an up-arrow key, the user may command the STB to interrupt the audio output. Upon pressing the up-arrow key again, the STB may be commanded to resume the audio output, picking up at the place of interruption.

The user may command the audio output to skip and begin at the next time slot (for example 10:30 p.m., the next major table) by pressing the up-arrow key twice in quick succession. The user may command the audio output to begin at the next day by pressing the up-arrow key three times in quick succession. After a quick pause, the voice may continue announcing the list of offerings available at that date, time and channel.

The user may command the audio output to begin at a previous time slot or a previous date by pressing the down-arrow key twice in quick succession or three times in quick succession, respectively.

Returning to FIG. 4, the user may hear “date?” after first hearing “current time?”. The user may select the date option in step 94, by pressing any key on the remote control. The audio may then begin announcing the viewing possibilities starting at a specific date and time. For example, the audio output may announce the following: October 1, 10:00 p.m. (brief pause), Channel 2—CNN Larry King Live (brief pause), Channel 3—movie, Dracula Meets Jerry Springer (brief pause), Channel 4—(and so on). The user may continue navigating through EPG content in a manner similar to that described for the current time option.

It will be appreciated that if a sighted user and a visually impaired user are both using the EPG presentation, the preferred method is to select both the audio and text/graphics configuration in step 84 (FIG. 3). In one embodiment, the appliance may default to the audio and text/graphics configuration, if the user does not select any of the available configurations. In another embodiment, the appliance may store the selected configuration, so that the user will not need to select the same configuration again.

When the audio and text/graphics configuration is selected, server 20 may transmit the front page of the EPG for display on the television screen. Server 20 may also transmit the audio files, corresponding to the text on the page, for listening. These files may be transmitted serially for storage in the STB, and then played-back as the user is navigating the EPG. Alternatively, the files may be transmitted from the server, upon request by the STB, while the user is navigating the EPG.

In an embodiment of the invention, a sighted user may navigate the EPG text displayed on the screen. When the user focuses on a specific grid of the EPG, the audio portion corresponding to the specific grid may then be announced by voice. When the user focuses on another grid, the voice may announce the text (or legend) corresponding to the newly focused grid. For example, date/channel/time/legend audio files for a specific grid may be downloaded from the server and announced. In this manner, the sighted user and the visually impaired user may enjoy navigating the EPG together.

When the visually impaired user is navigating the EPG by himself, audio files of channel, date and time may be downloaded once for the entire EPG page displayed on the screen. Legends in each specific grid, however, may be downloaded only when the user stops or focuses on a specific grid. In this manner, when the user navigates, the STB may announce the position of the focus point, in terms of channel number, date and time. When the user focuses on a specific grid, the STB may announce the details on the specific grid.

It will be appreciated that files downloaded from the server may be selectively discarded from the STB. For example, when the audio storage or audio buffer is full, files may be discarded; when the program is finished, files may be discarded.

Figure 5:
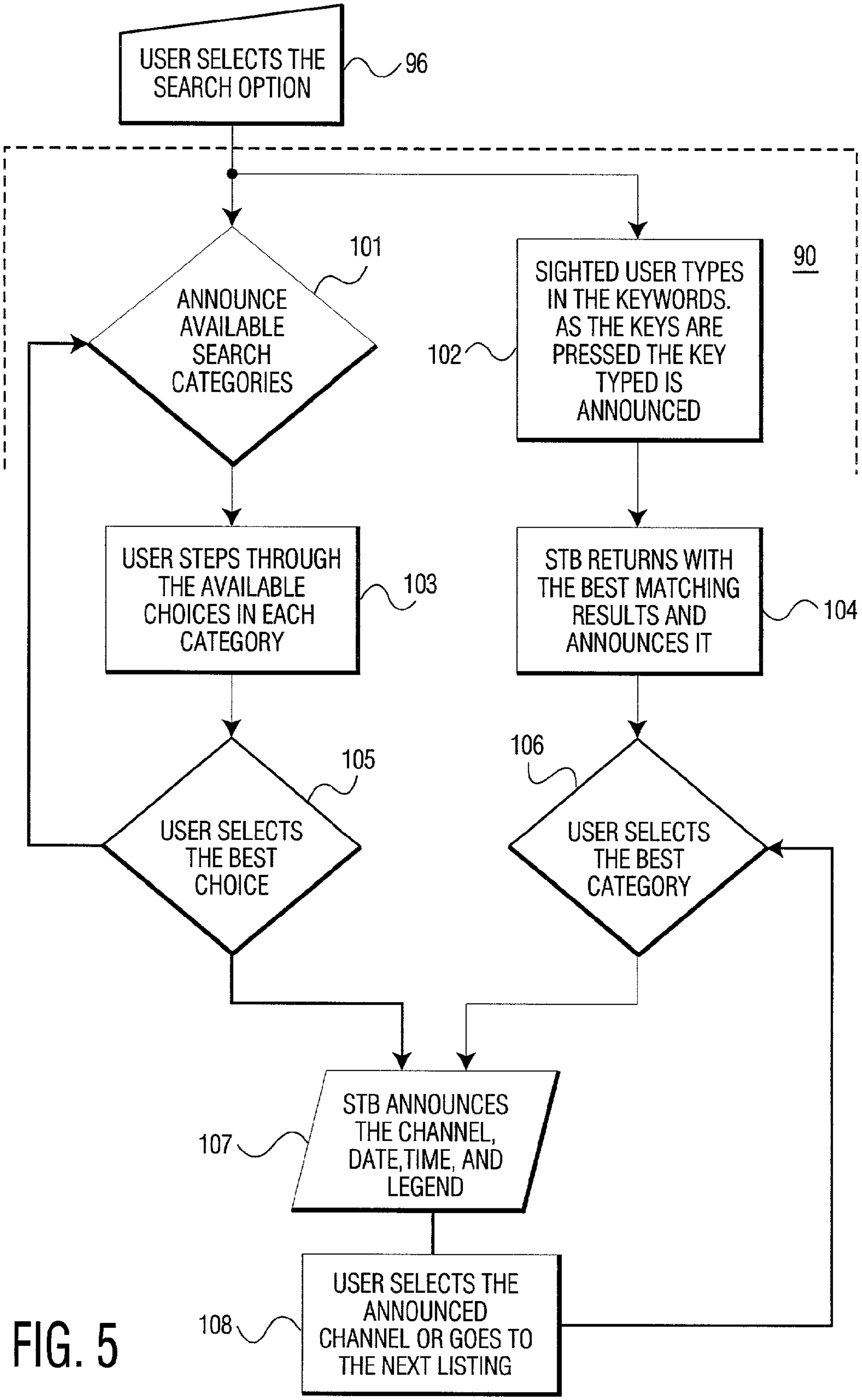
FIG. 5 illustrates steps involved in navigating through an electronic program guide when the user selects a search option shown in FIG. 4.

Completing the description of FIG. 4, a user may select the search option in step 96. If a visually impaired user selects the search option (as identified by selecting the audio-only configuration in step 83 of FIG. 3), the navigation process (generally designated by numeral 90 in FIG. 5) branches to step 101. The STB may sequentially announce available search categories, for example sports, movies, situation comedies, serial dramas, etc. In step 103, the user may listen to available search categories and in step 105, the user may select a category. Since a user may wish to hear all the available search categories before selecting the best choice, the STB may sequence though the available categories by announcing the choices more than once (shown as feedback from step 105 to step 101). As the desired category is again announced, the user may select the category by pressing any key on the remote control.

If a visually impaired user and a normally sighted user are both available for the search mode, navigation process 90 may branch to step 102. The sighted user may type a keyword, such as "sports" in step 102. As the keyword is typed on the remote control, the STB may announce each key typed. In step 104, the STB may return with the best matching results on the television screen and announce the same through the speakers. The user may then select the best category in step 106.

After selecting the desired choice or category, the STB may announce in step 107 the channel, date, time and legend. The user may select the announced channel, in step 108, or may sequence to the next listing.

Having described a visually impaired user listening to audio of EPG information, it will be appreciated that another embodiment of the invention includes a sighted user listening to an audio menu while driving a car. For example, the user may navigate through a news menu, weather menu, or sports menu while listening to audio information downloaded from a TTS server to an Internet appliance in the car.

It will be appreciated that the invention uses good quality TTS speech software at the server end. In this manner, cost of an information appliance is much lower since a TTS synthesizer need not be installed in the information appliance.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention. It will be understood, for example, that the same concept may be extended beyond EPG to include other data services, such as weather, news, sports, etc.

What is claimed:

1. A method of requesting electronic program guide (EPG) data which have been converted to EPG speech files using an information appliance coupled to a server at a location remote from the information appliance, comprising the steps of:

(a) requesting a portion of the converted EPG speech files corresponding to a particular time interval, the portion including a plurality of sections each section representing a respectively different sub-interval of the portion of the EPG speech files;

(b) receiving and storing the portion of the converted EPG speech files in the information appliance;

(c) presenting a sequence of aural prompts to a user, prompting the user to select time information corresponding to one section of the plurality of sections of the stored portion of EPG speech files to be extracted, the one section including a plurality of programs, each program associated with a respectively different channel;

(d) navigating through the stored portion of EPG speech files in the information appliance, responsive to the aural prompts, to extract the one section of the plurality of sections of the stored portion of EPG speech files;

(e) presenting the extracted one section of the stored portion of EPG speech files through audio speakers;

(f) receiving an indication of a location on a page of text corresponding to the extracted section of the stored speech files;

(g) transmitting the received indication to the server at the remote location;

(h) receiving, from the server at the remote location, a further portion of the EPG speech files corresponding to the received indication; and (i) presenting the further portion of the EPG speech files through the audio speakers.

2. The method of claim 1 in which step (a)includes requesting a portion of the EPG data that has been converted into the EPG speech files using a first text-to-speech (TTS) synthesizer and a second TTS synthesizer, whereby the first TTS synthesizer and the second TTS synthesizer use different languages.

3. The method of claim 1 in which step (a) includes requesting a portion of the EPG data that has been converted into the EPG speech files using a selected voice personality from one of multiple voice personalities.

4. The method of claim 1 including (j) presenting set-up configurations sequentially through the audio speaker;

(k) pausing the audio presented in step (j) between each set-up configuration; and (l) waiting a predetermined time period during each pause to receive an input command.

5. The method of claim 1 in which step (b) includes receiving the portion of converted EPG speech files at a periodic interval of time and storing the portion of the converted EPG speech files in a memory device of the information appliance.

6. The method of claim 1 in which step (c) further includes presenting a sequence of prompts in text form corresponding to the sequence of aural prompts.

7. A method of requesting electronic program guide (EPG) data according to claim 1, further comprising the steps of:

interrupting the presenting of one of the extracted sections of EPG speech files at a point in time, responsive to a user input; and resuming the presenting of the one extracted section of EPG speech files at the point in time, responsive to a further user input.

8. A method of requesting electronic program guide (EPG) data according to claim 1, further comprising the step of:

interrupting the presenting of one of the extracted sections of EPG speech files at a point in time and skipping to presenting another one of the extracted sections of EPG speech files that corresponds to a different time interval, responsive to a user input.

9. A method of providing information using an information appliance coupled to a server at a location remote from the information appliance, comprising the steps of:

(a) storing electronic program guide (EPG) text files in a database at the remote location;

(b) converting, at the remote location, the EPG text files stored in step (a) into EPG speech files and storing the converted EPG speech files;

(c) receiving a request for a portion of the EPG speech files converted in step (b) and a request for the EPG text files;

(d) retrieving the requested portion from the stored converted EPG speech files and transmitting to the information appliance the portion of the EPG speech files requested in step (c);

(e) receiving and storing the EPG speech files in the information appliance transmitted in step (d);

(f) presenting a sequence of aural prompts;

(g) navigating through the stored speech files in the information appliance, responsive to the aural prompts, to extract a section of the stored speech files;

(h) reformatting the EPG text files into a page of text and presenting the page of text on a television monitor;

(i) receiving an indication of a location on the page of text corresponding to the extracted section of the stored speech files; and (j) transmitting, from the remote location to the information appliance, a further portion of the EPG speech files corresponding to the received location indication.

10. The method of claim 9 in which the page of text includes at least one date, multiple channels, multiple times and at least one legend inserted in a grid; and step (d) includes transmitting speech files of the at least one date, multiple channels and multiple times;

step (i) includes receiving an indication of a location in the grid; and step (j) includes separately transmitting speech files of the legend in the grid location indicated in step (i).

11. A method of requesting electronic program guide (EPG) text data which have been converted to EPG audio data using a communications network, comprising the steps of:

(a) requesting a portion of the converted EPG audio data corresponding to a particular time interval, the portion including a plurality of sections each representing a respectively different sub-interval of the portion of EPG audio data;

(b) receiving from the network, by a set top box (STB), at least the portion of the converted EPG audio data;

(c) storing, by the STB, the at least the portion of the converted EPG audio data received in step (b);

(d) presenting a sequence of aural prompts to a user, prompting the user to select time information corresponding to one section of the plurality of sections of the stored EPG data to be extracted, the one section including a plurality of programs, each program associated with a respectively different channel;

(e) receiving commands, responsive to the sequence of aural prompts;

(f) extracting the one section of the EPG audio data, responsive to the commands entered in step (e)

(g) presenting the extracted one section of the EPG audio data through an audio speaker;

(h) receiving an indication of a location on a page of text corresponding to the extracted one section of the EPG speech files and transmitting the received indication to the network;

(i) receiving, from the network, a further portion of the EPG speech files corresponding to the received indication; and (j) presenting the further portion of the EPG speech files through the audio speaker.

12. The method of claim 11 in which step (b) includes receiving the EPG audio data at periodic time intervals.

13. The method of claim 11 in which step (i) includes presenting the EPG audio data by announcing at least a channel, a time, and a legend corresponding to the channel and time;

pausing the announcement through the audio speakers; and presenting by announcing at least another channel, time, and legend immediately after pausing the announcement.

14. The method of claim 11 in which step (g) includes presenting the EPG audio data by announcing at least a channel; and selecting the channel for one of listening and viewing.

15. The method of claim 11 in which step (d) further includes presenting a sequence of prompts in text form corresponding to the sequence of aural prompts.

selecting the channel for one of listening and viewing.

16. An audio enabled data service system, including an information appliance comprising:

a memory device;

a modem adapted to connect to a network;

a processor coupled to the modem for (a) communicating on the network, (b) periodically receiving portions of electronic program guide (EPG) speech files from the network, each portion corresponding to a respectively different time interval and each portion including a plurality of sections each representing a respectively different sub-interval of the respective portion (c) storing the portion of EPG speech files in the memory device and (d) providing a sequence of aural navigation prompts to a user, prompting the user to select time information corresponding to one section of the plurality of sections of the stored portion of EPG speech files to be extracted, the one section including a plurality of programs, each program associated with a respectively different channel;

a receiver for accepting input commands from a remote control, the input commands entered responsive to the sequence of aural navigation prompts;

an audio speaker configured with the processor to present the sequence of aural navigation prompts; and the processor, responsive to the input commands accepted by the receiver for (a) extracting the one section of the plurality of sections of the portion of the EPG speech files stored in the memory device (b) presenting the extracted one section of the stored portion of EPG speech files through the audio speaker (c) receiving an indication of a location on a page of text corresponding to the extracted one section of the EPG speech files (d) transmitting the received indication to the network, (e) receiving, from the network, a further portion of the EPG speech files corresponding to the received indication (f) presenting the further portion of the EPG speech files through the audio speaker.

17. The audio enabled data service system of claim 16 including a server coupled to the network;

wherein the server includes a storage device for storing the portions of EPG data, a text-to-speech (TTS) synthesizer for converting the portions of EPG data into the EPG speech files, and a transmitter for transmitting the portions of EPG data and the EPG speech files onto the network.

18. The audio enabled data service system of claim 17 wherein the TTS synthesizer includes a synthesizer using one of a first language and a second language, whereby the first language is different from the second language.

19. The audio enabled data service system of claim 17 wherein the TTS synthesizer includes multiple voice personalities for converting the portions of EPG data into EPG speech files; and the TTS synthesizer selects one of the multiple voice personalities, in response to an input command from the remote control.

20. An audio enabled data service system comprising:

a television monitor; and an information appliance comprising:

a memory device, a modem adapted to connect to a network, a processor coupled to the modem for (a) communicating on the network, (b) periodically receiving electronic program guide (EPG) speech files and EPG text files from the network, (c) storing the EPG speech files in the memory device and (d) providing a sequence of aural navigation prompts, a receiver for accepting input commands from a remote control, the input commands entered responsive to the sequence of aural navigation prompts, and an audio speaker configured with the processor to present the sequence of aural navigation prompts, the processor is responsive to the input commands accepted by the receiver for (a) extracting a portion of the EPG speech files stored in the memory device and (b) sending the extracted portion of the EPG speech files to the audio speaker, wherein:

the processor formats the EPG text files into a page of text and the processor provides the page for display on the television monitor, the page including a section, the section including a plurality of sub-sections, the extracted portion of the EPG speech files corresponds to the section, the receiver accepts an input command which provides an identifier for identifying a location of a sub-section of the plurality of sub-sections on the page displayed on the television monitor, and the processor, in response to the identifier, requests from the network, further portion of the EPG speech files corresponding to the identified location of the sub-section on the page, receives the further portion from the network and sends the corresponding further portion of the EPG speech files to the audio speaker.

21. The audio enabled data service system of claim 20 wherein the page includes at least one date, multiple channels, multiple times, and at least one legend inserted in a grid;

the identifier identifies the grid on the page; and the further portion of the EPG speech files extracted by the processor includes the legend inserted in the grid.

22. The audio enabled data service system of claim 21 further including a server coupled to the network, wherein the server includes a storage device for storing the (EPG) text files, a text-to-speech (TTS) synthesizer for converting the EPG text files into the EPG speech files, and a transmitter for transmitting the EPG text files and the EPG speech files onto the network, the processor receives the EPG speech files in response to a download request from the server; and the download request includes a first download request for the at least one date, multiple channels and multiple times, and a second download request for the legend inserted in the grid.

23. The audio enabled data service system of claim 20 wherein the processor provides a sequence of prompts in text form corresponding to the sequence of aural navigation prompts for display on the television monitor.

* * * * *